(12) United States Patent
Soluri et al.

(10) Patent No.: US 6,734,430 B2
(45) Date of Patent: May 11, 2004

(54) HIGH SPATIAL RESOLUTION SCINTIGRAPHIC DEVICE HAVING COLLIMATOR WITH INTEGRATED CRYSTALS

(75) Inventors: Alessandro Soluri, Rome (IT); Raffaele Scafe', Anguillara S. (IT); Nunzio Burgio, Rome (IT); Alfiero Schiaratura, Rome (IT)

(73) Assignee: C.N.R.-Consiglio Nazionale Delle Ricerche, Rome (IT)

( * ) Notice: Subject to any disclaimer, the term of this patent is extended or adjusted under 35 U.S.C. 154(b) by 97 days.

(21) Appl. No.: 09/927,347

(22) Filed: Aug. 13, 2001

(65) Prior Publication Data

US 2002/0175289 A1 Nov. 28, 2002

(30) Foreign Application Priority Data

May 23, 2001 (IT) ..................... RM2001A0279

(51) Int. Cl.$^7$ ............................. G01T 1/202
(52) U.S. Cl. .................... 250/363.1; 250/367
(58) Field of Search .............. 250/363.1, 367

(56) References Cited

U.S. PATENT DOCUMENTS

| | | |
|---|---|---|
| 5,252,830 A | 10/1993 | Weinberg |
| 5,323,006 A | 6/1994 | Thompson et al. |
| 5,451,789 A * | 9/1995 | Wong et al. ............ 250/363.03 |
| 5,519,221 A | 5/1996 | Weinberg |
| 5,783,829 A | 7/1998 | Sealock et al. |
| 5,864,141 A | 1/1999 | Majewski et al. |
| 5,949,850 A | 9/1999 | Tang |
| 6,021,341 A | 2/2000 | Scibilia et al. |
| 6,232,605 B1 | 5/2001 | Soluri et al. |
| 6,242,744 B1 | 6/2001 | Soluri et al. |
| 6,271,524 B1 * | 8/2001 | Wainer et al. ......... 250/363.03 |

FOREIGN PATENT DOCUMENTS

| | | | |
|---|---|---|---|
| DE | 197 43 440 A1 | 4/1999 | |
| GB | 2 034 148 A | 5/1980 | |
| WO | WO 96/37791 A1 | 11/1996 | |
| WO | WO 98/48300 A2 * | 10/1998 | ........... G01T/1/164 |

\* cited by examiner

Primary Examiner—Constantine Hannaher
(74) Attorney, Agent, or Firm—Browdy and Neimark, P.L.L.C.

(57) ABSTRACT

A miniaturized scintigraphic device comprising a collimator (1), internally having a multiplicity of equal conduits (10) of determined length, identified and separated by septa (11) of minimum thickness in relation to the energy of the radiation, terminating in a common end plane (12) on the side opposite to the source of the event to be measured, comprising a scintillation crystal structure (2) and at least a photomultiplier (3), in which the scintillation crystal structure is constituted by a multiplicity of individual crystals (20) with polygonal section, each integrally integrated in proximity to the end, oriented towards the photomultiplier (3), of each conduit (10) of the collimator (1), having conforming polygonal section, and arranged in such a way that all the base faces (21) of the crystals (20) oriented towards the photomultiplier (3) are mutually coplanar and lying on a plane parallel to said common end plane (12) of the collimator (1).

14 Claims, 3 Drawing Sheets

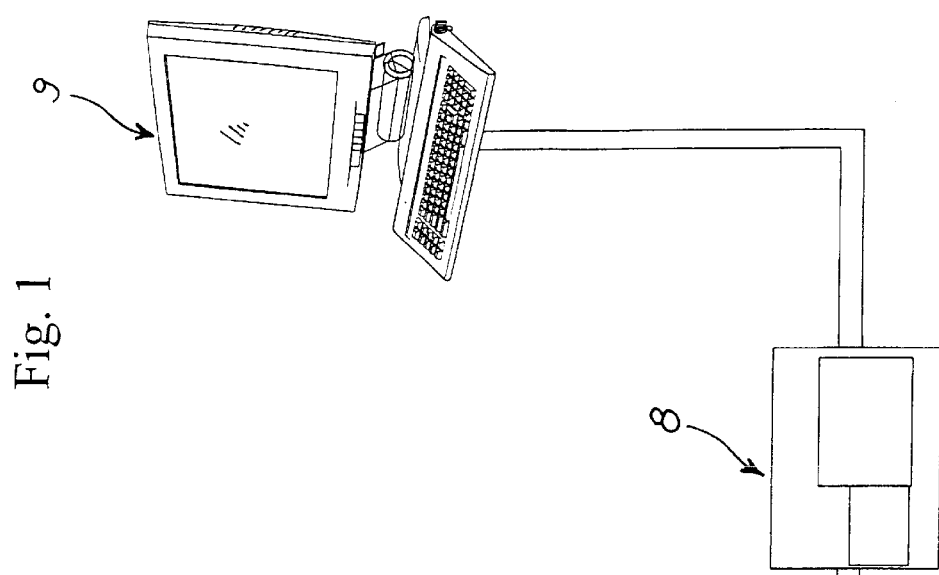
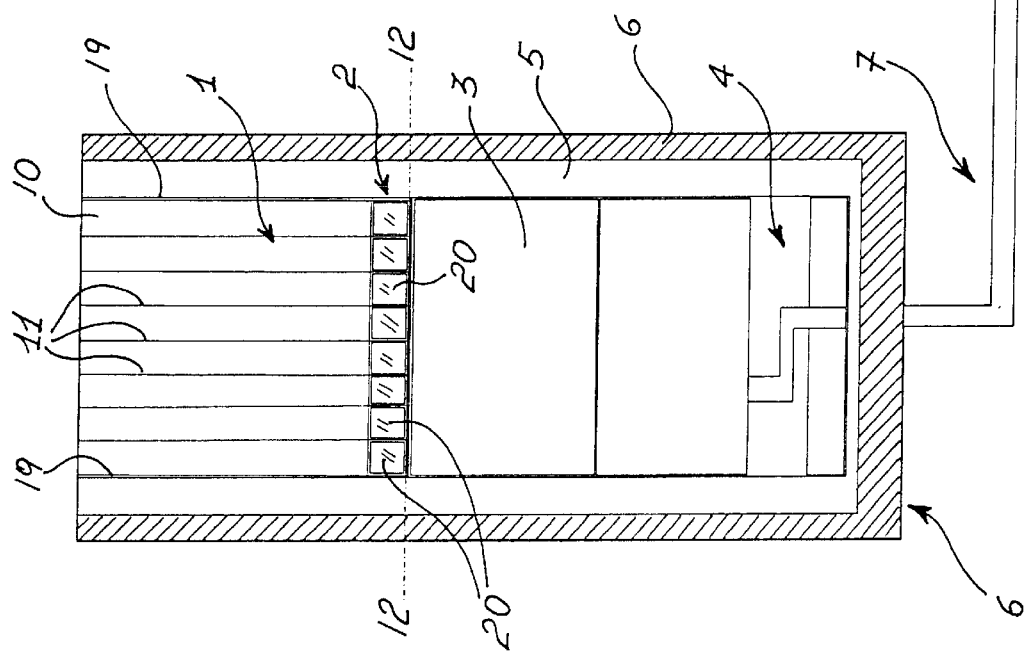
Fig. 1

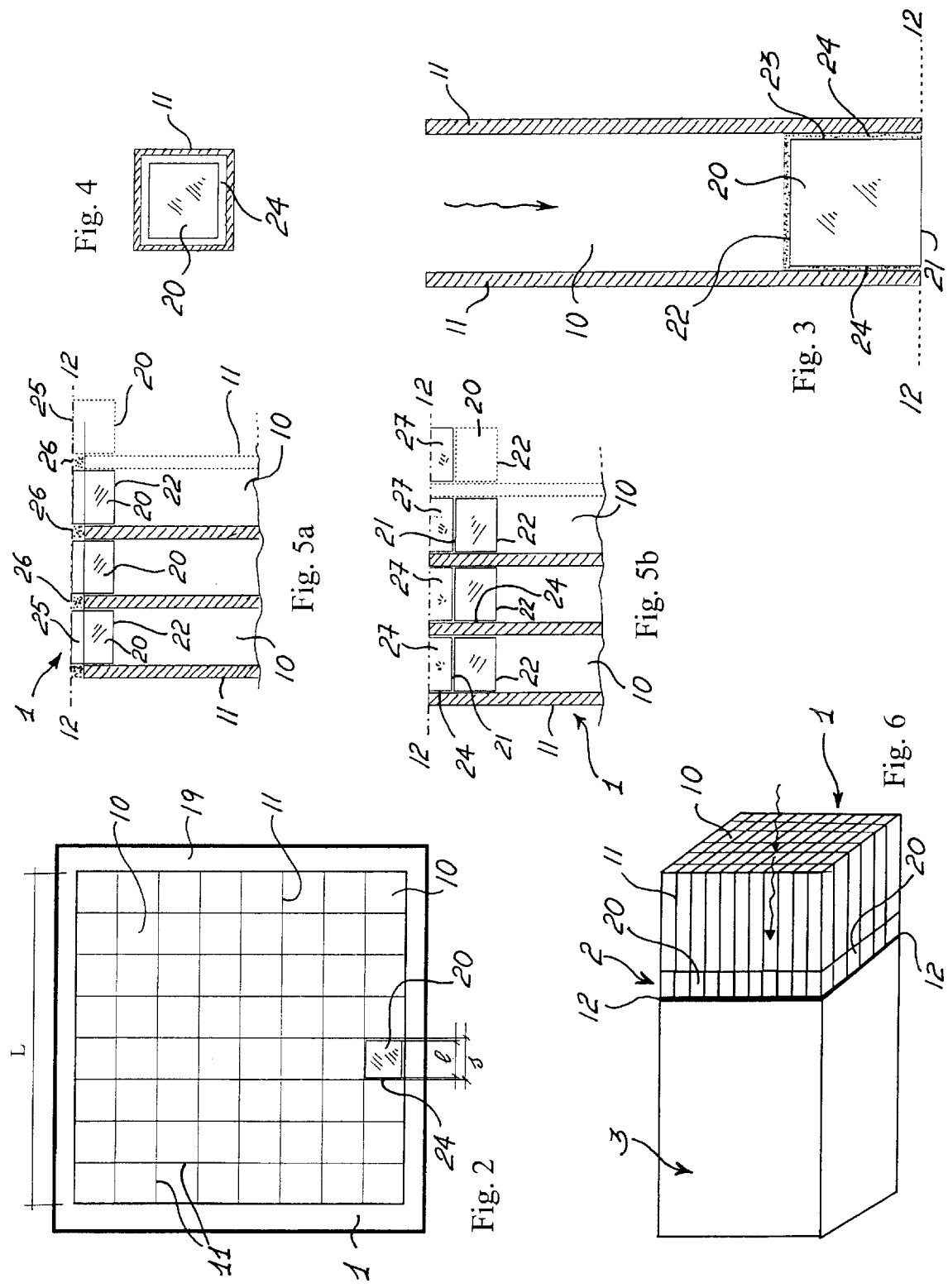

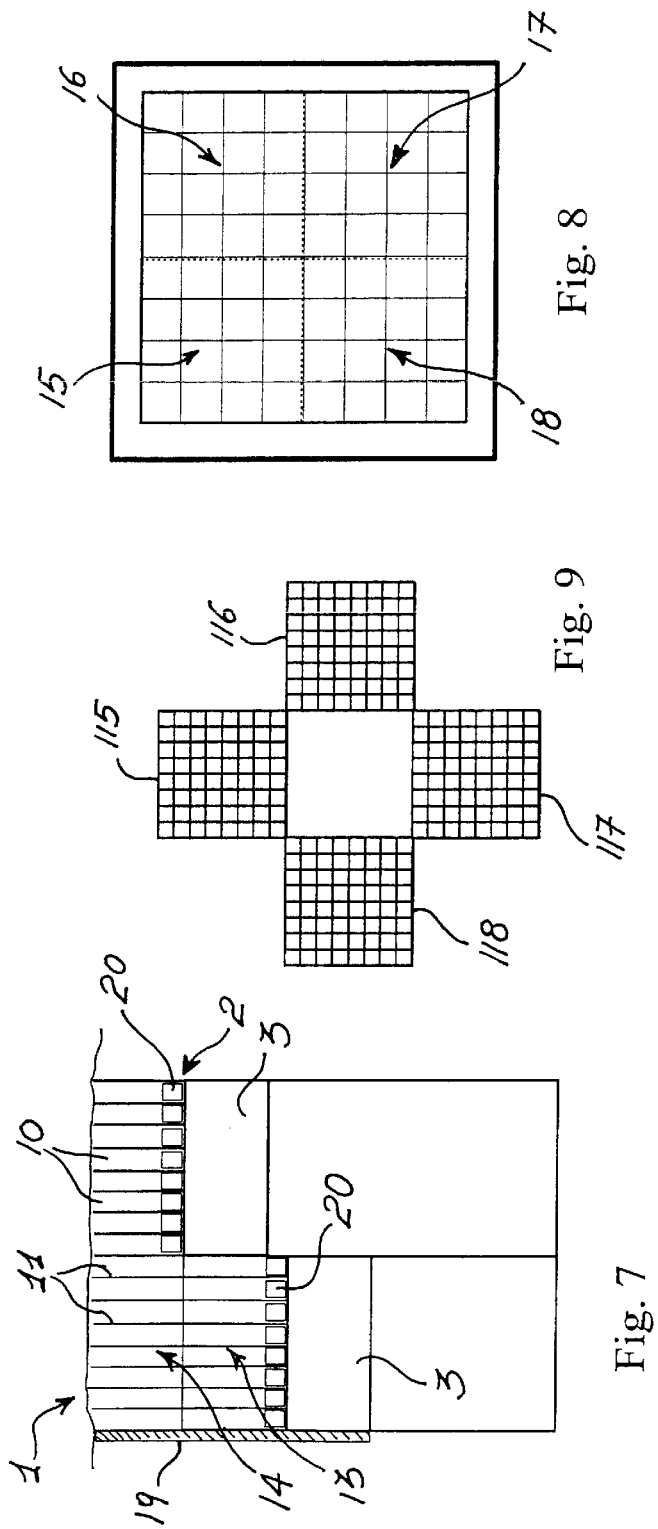
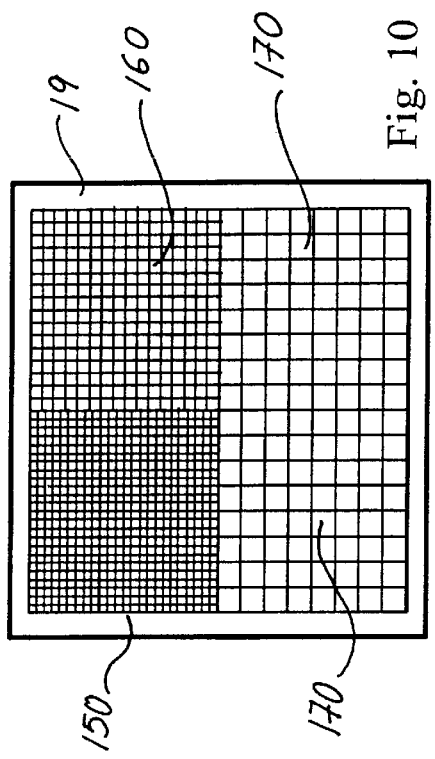
Fig. 7
Fig. 8
Fig. 9
Fig. 10

HIGH SPATIAL RESOLUTION SCINTIGRAPHIC DEVICE HAVING COLLIMATOR WITH INTEGRATED CRYSTALS

The present invention relates to a high spatial resolution scintigraphic device having collimator with integrated crystals, external diagnostic use or for guided surgery applications, requiring the identification of the localization of tumour lesions.

In particular, functional imaging systems with small field of view (see U.S. patent application Ser. Nos. 09/202,894 and 09/202,790 in the name of Alessandro Soluri et al.) can be applied in Nuclear Medicine as location and diagnostic devices, of reduced weight and minimum size, in order to identify neoplasias with high spatial resolution. Use of said devices can also find application in the scintigraphic analysis of small animals, in order to experiment new radio-marked antibodies, specific for particular pathologies. Another field of application relates to the guided localization of prostate and breast lesions, in order to identify the areas with higher uptake to be subjected to bioptic sampling, to integrate current radiographic and/or echographic techniques. Such devices can find further applications in Astrophysics and in industrial non destructive test systems.

In particular, the main use of the device relates to locating tumour lesions, especially in those techniques that require an adequate spatial precision such as biopsies (prostate and breast) or in radio-guided or radio-immune-guided surgery. To remove a tumour lesion, the surgeon needs to identify its location and, for this purpose, he/she normally uses the results of diagnostic investigations performed previously with techniques known as RX, CAT scans, NMR and traditional Scintigraphy. However at the moment of the operation, after "opening" the part, the surgeon may need to locate even more precisely the area to be cut or removed and, for this purpose, he/she can employ a so-called "surgical probe". After injecting into the patient a radio-pharmaceutical, which has the peculiarity of being fixed more specifically in tumour cells, the surgeon uses a probe to detect the gamma rays emitted by the radioisotope, present in the molecules of the drug in the area examined at a given time. The probe is sensitive to the intensity and energy of the detected gamma radiation and provides analogue signals that are proportional to the radioisotope concentration measured in the region identified by a single channel collimator.

The detected signals are converted to digital form providing information, in a light or sound scale, about the intensity of the signals that fall within the selected energy window. The limitation is constituted by the impossibility of providing an image that describes the spatial map of the concentration of radio-pharmaceutical and that only provides the visualisation of the counts in the area identified by the collimator.

This limitation of current technologies is mainly due to the poor spatial resolution (about 1 cm) and to the considerable dimensions of current commercial gamma-cameras.

Already the devices claimed by Soluri et al. (see U.S. patent application Ser. Nos. 09/202,894 and 09/202,790), in addition to those claimed by Francesco De Notaristefani et al. (WO 96/379791), Sealock et al. (U.S. Pat. No. 5,783,829), Stan Majewski et al. (U.S. Pat. No. 5,864,141), Scibilia et al. (U.S. Pat. No. 6,021,341), propose improvements both in terms of spatial resolution and in terms of reduced size and weight. Nevertheless, in some applications, the required spatial resolution becomes a fundamental parameter, so it is necessary to improve spatial resolution.

One of the current limitations surely consists of the inability to locate in a precise manner the spatial position of events that reach individual elements of the scintillating crystal. Current devices prevalently use photomultipliers, or photo-tubes, of the latest generation, known as PSPMTs (Position Sensitive Photomultiplier Tubes) coupled to crystal matrices located at the output of a lead collimator, general purpose or high resolution, normally with hexagonal holes. Alternatively the scintillating crystals are constituted by planar elements, located at the output of the same types of collimators. In this case, using a planar scintillation crystal with traditional photomultipliers (PMT=Photomultiplier Tube), expected spatial resolutions are definitely inadequate in reference to the diagnostic techniques described above.

Scintillation crystals, with polygonal form and suitable thickness, can be inorganic or organic, both in the hyper-pure state and doped with suitable quantities of appropriate materials in order to boost their scintillation properties (for instance: CsI(Tl), CsI(Na), NaI(Tl)), according to the type of application to be achieved, to the diagnostic techniques and to the tracers employed. In any case, the emission spectrum of the scintillation light must exhibit a good superposition with that of absorption of the photosensitive layer of the photomultiplier.

The main limitation of the prior art consists of the fact that, when employing square section crystal matrices coupled with collimator with hexagonal holes, it is not possible to achieve such a geometric alignment as to guide photons into the specific area of the individual element of the scintillation matrix. A hexagonal hole will allow the passage of photons on a crossing area between multiple individual elements of the scintillation crystal, so that when the position is computed multiple points can be visualised on the image, if spatial resolution is sufficient to separate them. In this way the number of photons integrated for that hole and that have stricken the individual scintillating element is recorded.

One aim of the invention is to obtain a miniaturised imaging system that is optimised and dedicated to individual scintigraphic applications.

Another aim of the invention is to obtain a scintigraphic device, of reduced size, usable also for external diagnoses of tumours of small dimensions (for instance skin melanomas, thyroid pathologies, etc.), and of extremely reduced weight of better ease of handling, with the capability to visualise areas of interest that would be difficult to reach with current devices.

An additional aim of the invention is to obtain a device which, employing crystals associated to collimators, achieves a perfect geometric alignment, such as to guide the photons.

Yet another aim of the invention is to achieve a miniaturised device with high spatial resolution, suitable for use both during surgical operations and as an external diagnostic device for detecting tissues areas invaded by tumour formations of small size.

Therefore, the invention, as it is characterised in the claims that follow, solves the problem of providing a miniaturised high spatial resolution scintigraphic device having collimator with integrated crystals, comprising in succession from an open end of a container coated with a shielding cladding starting from the source of the event to be detected:

a collimator made of a material with high effective atomic number, having internally a multiplicity of equal conduits of determined length, identified and separated by septa of a thickness suitable to the energy of the photons to be detected, terminating in a common end plane on the opposite plane to the source of the event to be measured;

a scintillation crystal structure able to convert the radiation from the source being examined into light radiation;

at least a photomultiplier of the type with crossed anodes or crossed wires receiving the light radiation emitted by the scintillation crystal structure and generating electrical signals proportional to their intensity and identifying the position co-ordinates (X,Y) of the event;

electronic circuits to amplify and integrate the signals generated by the photomultiplier to determine event position co-ordinate and the related energy for the subsequent transfer to the conversion device and hence to an electronic processor that process and displays them on a monitor in the form of an image which, from a general point of view, is characterised in that said scintillation crystal structure is constituted by a multiplicity of individual crystals with polygonal structure, with base faces and lateral surface, each integrally integrated in proximity to the extremity, oriented towards the photomultiplier, of each conduit of the collimator, having conforming polygonal section and positioned in such a way that the base faces of the crystals oriented towards the photomultiplier lie in a same plane, parallel to said common end plane of the collimator.

Further characteristics and advantages of the invention shall become more readily apparent from the description that follows, with reference to the accompanying drawings, provided purely by way of non limiting example in which the illustrative content of the figures that follows is specified below:

FIG. 1 schematically shows, substantially in blocks, a device according to the invention, based, for example, on a single complex of collimator photomultiplier devices;

FIG. 2 schematically shows a plan view of a collimator of a device according to the invention;

FIG. 3 schematically shows a longitudinal section of an individual collimator conduit with related crystal of a device according to the invention;

FIG. 4 shows a cross section of the collimator conduit of FIG. 3;

FIGS. 5a and 5b show a partial, schematic cross section of a second and a third embodiment of the present invention;

FIG. 6 schematically shows a perspective view of a complex of collimator and photomultiplier according to the invention;

FIG. 7 schematically shows a partial longitudinal view of a device with multiple photomultipliers and collimators;

FIG. 8 schematically shows a plan view of a collimator in the case of a multiple device with extended field of view based on four adjacent PSPMTs;

FIG. 9 schematically shows, by way of example, a collimator in the case of a multiple device with extended field of view based on four consecutive PSPTMs;

FIG. 10 schematically shows, by way of example, a collimator in the case of a multiple device with extended field of view based on four adjacent detection units with different spatial resolutions.

With reference to the figures, a device according to the invention with a single photomultiplier and, respectively, with four photomultipliers is illustrated.

In FIG. 1, which shows the device with single photomultiplier, the reference number 1 indicates a collimator, 2 a scintillation crystal structure, 3 a PSPMT photomultiplier, 4 electronic components for conditioning and regulating the charge signals coming from the photomultiplier 3, 5 a container, 6 a shielding cladding, 7 signal and power supply connection cables, 8 a block comprising a low voltage power supply and analog-digital converters and 9 an personal computer.

With reference to FIGS. 1 and 2, is shown a collimator 1 for low energy of gamma photons. The collimator 1 internally has a multiplicity of equal conduits 10 of determined length, identified and separated by septa 11 of minimum thickness, suitable for the photons energy be detected, terminating in a common end plane 12 on the opposite side from the source of the event to be detected.

The collimator 1 is made of a material with high effective atomic number ($Z_{eff}$) and high density, such as tungsten, lead, gold, tantalum, palladium, etc. Said material is therefore provided with high power of attenuation against the intensity of the radiation (of fixed energy or lower) coming from regions of the visual field not included in the solid angle intercepted by its holes. By way of example, in one embodiment, the penetration factor of the septa is less than 0.7% and the collimator 1 has overall parallelepiped shape with base of 26.2 mm×26.2 mm and height of 35.0 mm (FIGS. 2 and 4).

As shown in particular in FIGS. 1, 3 and 4, the scintillation crystal structure 2 is constituted by a multiplicity of individual crystals 20 with polygonal section. The scintillation crystal structure 2 is able to convert radiation coming from a source under examination into light radiation.

Each crystal 20 has base faces 22, 21, oriented towards the source of emission of the radiation and, respectively, towards the photomultiplier 3, and lateral surface generically indicated as 23.

Each crystal 20 is integrally integrated in proximity to the extremity, oriented towards the photomultiplier 3, of each conduit 10 of the collimator 1, having conforming polygonal section and positioned in such a way that all the base faces 21 of the crystals 20 oriented towards the photomultiplier 3 are mutually coplanar parallel to an end plane 12 of the collimator 1 (FIG. 3).

By way of example, the individual square holes of FIG. 2, in the plan view of the conduits 10 of FIG. 1, have sides of 3.106 mm and each of them contains a scintillating crystal 30 of parallelepiped shape with base of 2.994 mm×2.994 mm and height of 5.0 mm. With reference to FIGS. 2 and 3, an example of configuration of the collimator 1 is described, where a scintillation crystal 20 is integrated in each conduit 10 of the collimator 1. In the case of a septum 11 of the collimator, made of tungsten, of 0.15 mm, the collimator being square with 8×8 conduits, crystals with surface area of 2.994 mm×2.994 mm should be used, with a reflecting and diffusing layer 24 for each side, except the one in contact with the photomultiplier, whilst the opening of the square hole of the collimator has a size of 3.106 mm×3.106 mm.

Thus, the lateral surface faces 23, in the interspace with the septa 11 and the base face 22 of each individual crystal oriented towards the source of the event, except the base face 21 for the escape of the scintillation light, are coated by the layer 24 of optically reflecting and diffusing material, with a thickness of 0.056 mm.

This optically reflecting and diffusing material is constituted by a paint based on synthetic resin, in particular and preferably said synthetic resin is constituted by an epoxy resin.

The height of each individual element is determined on the basis of a compromise between the desired detection efficiency and the fraction of light intensity emerging from the light escape face, as shall become more readily apparent farther on. In the case of the aforesaid example, the selected height is 5 mm. It is possible to use also light guides to be inserted between scintillation crystals and photomultiplier to optimise spatial linearity characteristics.

The base area of the collimator 1 coincides with the total area of the photomultiplier 3. The collimator is coated with a covering jacket 19, also made of material with high effective atomic weight ($Z_{eff}$) and high density. For example said container has walls with a thickness of 4.0 mm and height that can vary from 10 mm to 50 mm. The thickness of the lateral wall of the collimator can vary according to the type of material used and its power of attenuation on the radiation that comes laterally to the collimator.

The section of the septa is preferably square. Also by way of example, the length of the side, proximate to that of the crystals, is about 0.5 mm (and in any case ranging between 0.5 and 5 mm), with collimation septa having thickness of about 0.1 mm (and in any case ranging between 0.05 and 1 mm), and with the length of the collimation septa of about 10 mm (and in any case ranging between 2 mm and 50 mm).

The multiplicity of crystals 20, each whereof is integrated in the corresponding conduit 10 of the collimator 1, can present its base face 21, oriented towards the photomultiplier, flush and coinciding with the end plane 12 of the collimator (FIG. 3).

Alternatively as shown schematically in FIG. 5a each crystal 20 has an extremity portion 25 made of crystal projecting out of the end plane 12 of the collimator and comprises a planar layer 26 for rigid connection of all said extremity portions 25 of crystal made of optically reflecting and diffusing material, for instance of the type indicated above.

In this case, the laminas of the septa of the collimator go in depth in contact with the thickness of optically reflecting/diffusing material that mutually joins the extremity portions 25 of the scintillating elements which are, however, separated by the septa 11. In this way it is possible always to guarantee the geometric alignment between the individual crystals and the collimation holes.

Alternatively, in a variation of the invention shown in FIG. 5b, said multiplicity of crystals 20 has said base faces 21 of the crystals 20 oriented towards the photomultiplier 3 totally internal to the conduits 10 and lying on a same plane, parallel to and underlying said common end plane 12 of the collimator 1. On the base faces 21 of the crystal 20 and on the adjacent surfaces of the septa 11 said conduits 10, between the plane of lay of the base faces 21 and the common end plane 12 of the collimator 1, a layer 124 of said optically reflecting and diffusing material is present.

According to said solution compartments are created, defined between said base faces 21 of each crystal 20 and the respective adjacent surfaces of the septa 11 of said conduits 10 between the plane of lay of the base faces 21 and the common end plane 12 of the collimator 1. In these compartments can be present air or, advantageously, therein is present an optical guide material 27, constituting an element for guiding light, able to favour a method for distributing the light coming out of the crystal 20 onto the photomultiplier 3, for a better sampling of the light signals. Said optical guide material 27 can be constituted by common optical grease, quartz or optical fibres.

FIG. 6 shows a perspective view of a complex of collimator 1, multiplicity 2 of scintillation crystals 20 integrated therein (visible in transparent view) and photomultiplier 3, in which the arrows with undulated stem, shown also in FIG. 3, schematically indicate the direction of the radiation coming from the source of the event (not illustrated).

To determine the number N of crystals for each side of the collimator 1 of the FIG. 2, given the dimensions of the side L of the collimator 1, of the base side I of each crystal 20, of the thickness s of the septum of the collimator, of the thickness r of the optically reflecting and diffusing layer, the following formula can be used:

$$L=Nl+(N+1)s+2Nr$$

The scintigraphic device can be designed and built using the forecasting model (Raffaele Scafè et al.) that provides the configuration of components of the device itself (collimator, scintillating crystals, optical coupling, type of photomultiplier and charge reading circuit) optimised for the specific application in terms of detectability of the lesion, i.e. signal-to-noise ratio and contrast of the image that can be obtained. Said forecasting model allows to optimise the selection of the dimensions of the collimation holes and those of the scintillating crystals integrated therein, in such a way as to obtain the best lesion/background ratio obtainable in said class of application (dimension of the lesion, depth thereof and capture ratio relative to the background). The model also allows to compute the optimal values of the weight factors to be used in the electronic circuits for conditioning the charge signals, in order to minimise the spatial deformations of the image. This forecasting model lastly allows to compute the optimal thickness of any additional light guide for coupling the scintillating elements with the photomultiplier (said optimal thickness is the one that allows the best spatial separation of the responses of the individual crystals on the image plane).

All output faces of the light of individual crystals can be coplanar with the output plane of the collimator, providing a single surface which can be placed directly in contact with the optical window of the photomultiplier, or by means of a light guide of suitable thickness (depending on the intrinsic characteristics of the type of PSPMT used), for instance made of the aforesaid material. If for instance the application pertains to the localization of a breast carcinoma, one can hypothesised that the moderately compressed breast has a thickness of about 6 cm. Hypothesising that a tumour positioned at a depth of 3–4 cm is to be localized, a device can be constructed having an appropriate collimator length with suitable size of the collimator aperture (for instance with square shape) and related size of the scintillation crystals integrated inside the collimation holes. Using the forecasting model (see Raffaele Scafè et al.) it is possible to construct devices optimised for detecting tumour lesion as a function of their depth, size and radio-pharmaceutical uptake, optimising the expected spatial resolutions in individual cases. If the expected resolution relates to tumours that are more superficial or positioned at greater depth, the geometry of the collimator will vary as a consequence thereof.

In an optimised scintigraphic device based on a collimator with holes of a certain geometry and with integrated (hence of equal geometry) scintillating elements, each surface portion of the visual field selected by each collimation hole gives rise to scintillation events that are, by construction, located on an area coinciding with the selected one. This uses the maximum possible amount of spatial counting density, obtaining the maximum possible visibility of the lesions within the images produced by the scintigraphic device, in terms of lesion counts/background ratio and of contrast.

In any case the individual scintillation crystal is integrated inside the conduit and its surfaces are coated with an optically reflecting and diffusing material in order to maximise the light intensity that is conveyed to the light escape face (towards the PSPMT) of each single scintillation event.

The radiation, emitted in the visual field of the object under examination, will go to strike exclusively the scintillating crystal selected by the involved collimation hole and will be detected by the PSPMT), in terms of light photons, within the crystal area positioned in correspondence with the real projection of the emission point of the radiation on the detection plane. In other words, exploiting the geometric alignment obtained by construction between the collimation hole and the scintillating crystal integrated therein, all the capacity for spatial selection of the events obtainable with that particular collimation geometry. Hence, all deformation of the image, normally present in the devices of the generation prior to the present invention, due to the dishomogeneity (of geometric shape and/or of surfaces) between the patterns of the collimation reticle and of the scintillating crystal matrix.

One should mention, qualitatively, two additional effects that produce an improvement of the contrast of the image obtainable with such a scintigraphic device. They consist: (a) of the optimisation of the optical insulation between two contiguous scintillating elements and, (b) of the minimisation of the release of energy, by an incident radiation, in two different crystals of the scintillating matrix. The first effect (a) is due to the fact that, since the thickness of the collimation septum is, by its nature, opaque (i.e. highly absorptive) to the energy of the incident radiation, it is more so to the scintillation light, which is much less energetic than the first. Therefore, a fraction of the light intensity (slightly lower than average) will be recorded by the PSPMT in correspondence with the scintillating crystal correctly excited by the incident radiation, whilst the fraction escaping from the crystal itself will be absorbed by the closest septum of the collimator. The second effect (b) is due to the fact that a radiation that is diffused in the interaction with an atom of the scintillating crystal has high probability of being absorbed by the surrounding septum rather than giving rise to a new interaction (with generation of light photons, in a number proportional to the residual energy) within a surrounding scintillating element. The events that give rise to effects of the (b) type are therefore eliminated since the fraction of light energy released by the crystal (correctly) involved by geometric pertinence, will not in general be such as to exceed the set energy threshold for the generation of a contribution to the image.

Said forecasting model thus provides the capability of optimising a scintigraphic detector relative to the optimal spatial resolutions for particular diagnostic and/or location applications. This system, in particular, is well suited to support and complement current location systems for biopsies (prostate and breast) which operate without the functional information provided by scintigraphic detectors. The integrated use of these techniques allows the fusion of the current information with those obtained with scintigraphic techniques. In this case on the image shall be highlighted the pixel that has received the most events (maximum count) and as a consequence shall be spatially identifiable, in such a way as to address the sampling needle into the corresponding area. In general, the stop of the collimation hole (and the side of the crystal integrated therein) can vary from 1 mm to 3–4 mm according to the desired application and performance. In any case the scintigraphic device can be designed by classes of utilisation (depth of the tumour lesion, its size, i.e. of its staging and, of the radio-drug capture characteristics). In general, the spatial resolutions of 2–4 mm are actually the most interesting ones for diagnostic investigations, since under actual conditions the detectability of the lesions is always extremely difficult in the absence of specific antibodies, such as to produce on the image acceptable signal-to-noise ratios and contrasts.

With reference to FIGS. 7 through 10, embodiments of the device of the present invention with multiple collimators and/or photomultipliers are shown.

In particular, in FIG. 7 the collimator 1 is constructed in multiple modules of pre-set length, the first 13 whereof, opposite to the photomultiplier 3, exhibits integrated in the respective conduits 10 the multiplicity 2 of crystals 20 and at least a consecutive module 14 (lacking the scintillation crystals) is longitudinally correspondingly associated to the opposite end, held and guided for the perfect correspondence of the septa 11 by an outer jacket element 19 made of inert, sterilisable material. In this way, the length of its conduits 10 can be varied according to the desired configuration of the collimator 1.

In practical embodiments, to expand the image surface using small photomultipliers, multiple photomultipliers can be positioned mutually adjacent, with a superficial or linear longitudinal contact (consecutive) with a single collimator dimensioned to correspond to the entire receiving area determined by said multiple photomultipliers (FIG. 8) or with multiple corresponding distinct collimators also positioned mutually adjacent or consecutive.

In particular, the same FIG. 8 shows four photomultipliers (not shown) positioned mutually adjacent against four collimators 15, 16, 17, 18 positioned equally mutually adjacent with superficial longitudinal contact. Each of them has its section corresponding to that of the individual photomultipliers.

In FIG. 9, four photomultipliers (not shown) are positioned mutually adjacent, consecutive, against four collimators 115, 116, 117, 118 positioned adjacent with linear longitudinal contact. Each of the collimators has its section corresponding to that of the photomultipliers.

In FIG. 10, against four adjacent photomultipliers (not shown) are mounted respective collimators 150, 160, 170, 170 (the latter two, for instance, mutually identical), differentiated by width of the side of the crystal and corresponding width of the side of the collimator conduit in which the crystal is integrated, hence characterised by a different spatial resolution, relative to one or more adjacent collimators. In this case a multiple device with more than one adjacent photomultipliers can investigate different area with collimators having different spatial resolution.

The collimators can also be mutually differentiated in length relative to one or more of the adjacent collimators.

Naturally, in the case of a scintigraphic device obtained with multiple coupled photomultipliers, the area of the investigated field of view becomes larger.

It should be kept in mind that, in the multiple solution in which the photomultipliers and the related collimators are positioned adjacent, the outer lateral walls of the photomultipliers are maintained electrically isolated, then the thickness of the layer of electrical insulator MYLAR®, a thin strong polyester film, TEFLON®, polytetrafluoroethylene, or other material with similar characteristic) must be kept smaller than or equal to the thickness of the septum of the underlying collimator. For example, if the thickness of said septum is 0.15 mm, then the distance that separates the two photomultipliers must be no more than 0.15 mm. In this case the data of the formula that determines the dimensions of the hole of the collimator and the dimension of the crystal, are slightly different, since the last septum will, in practice, have a thickness equal to half the septum (0.075 mm) because the continuation of the septum of the collimator (another 0.075 mm) will belong to the collimator of the neighbouring photomultiplier. This holds true for each direction in which multiple photomultipliers are connected to build a matrix of photomultipliers suitable for forming areas larger than the individual, element. A photomultiplier or (as it is also commonly called) position sensitive photomultiplier tube 3 converts the scintillation light signals, corresponding to each individual event, into a charge distribution on the plane XY, hence memorising both the number of light photons generated by the event, and the position of the individual crystal that generated them. This is made possible by an appropriate charge multiplication system, within the PSWT, which amplifies the quantity of charge produced at the photocathode in such a way as to allow the operation of the signal conditioning circuits, as shall be discussed farther on.

The device comprises one or more position sensitive photomultipliers, from a new type of collimator with holes of variable pitch of polygonal section that contain integrated within them scintillating crystals whose section (including the optical coating) is equal to the collimation section, so that the total area of the collimated field of view coincides with the total area of the photomultiplier or of the photomultipliers (if more than one) used. The device is provided with electronics suitable for conditioning the charge signals produced by the photomultiplier and with a software for processing and visualising the image produced in real time, in such a way as to yield images with spatial resolutions of around 2 mm.

In this case, one uses the same diagram of the electronic circuits for signal conditioning proposed by Soluri et al. in the aforementioned prior patents for identifying the localization of the centroid of the individual event, as well as of the energy deposited thereby.

In particular, the collection of the charge takes place, within the PSPMT, by means of a known system with anodes crossed according to the axes X and Y of the plane of the field of view. In an equally known alternative, not described in detail herein, can also be employed PSPMT provided with multi-anode systems constituted by individual independent anodes, with polygonal shape and arranged in a matrix. In this case the collection of the charge can be brought back to the one effected by the PSPMT with crossed anodes, and using the signal conditioning circuits mentioned in the previous invention. Subsequently the charge signals exiting the photomultiplier are analysed to measure the quantity of charge collected by the individual anodes and to determine the centroid of the event, by means of the appropriate electronic components 4.

In any case, both if the device is formed by an individual PSPMT or by multiple PSPMTs and if the resistive network or sum/weighted sum technique is used, the transduction into analogue form of the charge centroid or of the X, Y co-ordinates and of the energy of the event is obtained by means of two voltage signals for each co-ordinate for a total of four signals.

The electronic processing chain of the system, of conventional type not shown herein, provides at this point the digitalisation of said signals by means of A/D converters 8 (FIG. 1). The choice of digitising the signals at this processing stage is dictated purely by economic and technological criteria and allows at the current state of the art a good compromise between total system cost, ergonomics of use, quality of the results obtained and processing speed.

The digitised signals are then transmitted to a personal computer 9 which, by means of a known dedicated software, completes the processing chain conducting respectively the following operations for the final calculation of the co-ordinates of the event:

$X=X_a/(X_a+X_b)$; $Y=Y_a/(Y_a+Y_b)$; in the case of the resistive chain $X=\Pi x/\Sigma x$; $Y=\Pi y/\Sigma y$; in the case of sum/weighted sum The dedicated software is also able to perform further processing operations on the collected data, able to improve the quality of the final result presented to the user.

For infra-surgery applications, the entire scintigraphic device will be coated with an additional cladding or protective sheath of inert and sterilisable material.

A suitable presentation software is able to provide the visualisation of the information as uptake images of the tracers injected into the patient, with the same typical representation as large-area scintigraphic devices.

Positioning a scintigraphic device in proximity to the region of interest of the patient's body, into which has been injected a radio-pharmaceutical able selectively to be fixed onto tumour cells and able to emit characteristic radiation of known energy, the surgeon will be able to locate the areas with greater uptake, identifying the area of maximum signal (which corresponds to the maximum measured radiation intensity) with spatial resolution of a few mm.

This allows the surgeon to operate with extreme certitude and precision, only in the specific area interested by the tumour, reducing any surgical damages and risks for the patient.

It is also possible to use radio-pharmaceutical with different energies and hence to offer the possibility of using specific antibodies for determined tumours with different radioisotopes, commonly used in Nuclear Medicine.

The dimensions of the photomultiplier used may also vary, reaching active area dimensions that are even larger than those mentioned heretofore, but still such as to be considered miniaturised relative to a traditional, large field of view scintigraphic device, and still such as to allow the achievement of the proposed aims. In the proposed invention a PSPMT is used for the calculation of the event position, contrary to scintigraphic devices (large area gamma-cameras) which make use of multiple, non position-sensitive PMTs (Photo Multiplier Tubes) coupled to a single scintillation crystal to achieve the same aim.

The advantages pertain to the capability of obtaining scintigraphic devices that can be optimised according to the required applications. The use of collimators and integrated crystals, allowing to have superior diagnostic responses in terms of counting efficiency and better lesion/background ratio and contrast on the produced image. The device is well suited for those locating techniques in which the identification of a single scintillation element can give a very precise indication on the position of the examined area with higher radioactivity uptake. In clinical practices such as radio-guided biopsy, using a suitable radio-pharmaceutical, this technique can be particularly well suited, since it allows the precise identification of the sampling points.

In addition to this technique, the combined use of small devices with these characteristics also allows other dedicated applications, for instance PET or PEM, with high spatial resolution, or integrating these devices with other diagnostic techniques such as those with ultrasounds, with X-rays, with magnetic resonance, etc.

Another advantageous application of the invention relates to the possibility of mounting, in a multiple device, sections of the field of view provided with collimators of different height (but also simultaneously of equal or different collimation pitch). This allows, for instance, to better identify lesions located at different depth, in terms of lesion/background ratio and contrast measured on the obtained image.

The applications can also be dedicated to various sectors such as Astrophysics, obtaining modules with extended detection areas assembling individual photo-multipliers based on the proposed method. Industrial applications pertain, for instance, to non destructive testing and diagnostic systems that can be obtained with devices that use the proposed technique.

Obviously, the constructive details and the embodiments can vary widely from those described and illustrated herein purely by way of example, without thereby departing from the scope of the present invention as claimed hereafter.

What is claimed is:

1. A high spatial resolution scintigraphic device having collimator with integrated crystals, comprising in succession from an open end of a container (5) coated with a shielding cladding (6) starting from the source of the event to be measured:

a collimator (1) made of a material with high atomic number, internally having a multiplicity of equal conduits (10) of determined length, identified and separated by septa (12) of thickness suited to the photons energy to be detected, terminating in a common end plane (12) on the opposite side from the source of the event to be measured;

a scintillation crystal structure (2) able to convert the radiation from the source under examination into light radiation;

at least a photomultiplier (3) of the type with crossed anodes or crossed wires receiving the light radiation emitted by the scintillation crystal structure (2) and generating electrical signals proportional to their intensity and identifying the single event position co-ordinates (X,Y);

electronic circuits (4, 7, 8) able to execute the amplification and integration of the signals generated by the photomultiplier (3) for the determination of the event position co-ordinates (XY) and the related energy for their subsequent transfer to a conversion device and thence to an personal computer (9) which process them and displays them on a monitor in the form of an image, characterised in that said scintillation crystal structure (2) is constituted by a multiplicity of individual crystals (20) with polygonal section, with base faces (21, 22) and lateral surface (23), each integrally integrate in proximity to the end, oriented towards the photomultiplier (3), of each conduit 10) of the collimator (1), each conduit having a polygonal section corresponding to the polygonal section of each individual crystal, and positioned in such a way that all the base faces (21) of the crystals (20) oriented towards the photomultiplier (3) lie in a same plane parallel to said common end plane (12) of the collimator (1).

2. A scintigraphic device as claimed in claim 1, characterised in that each crystal (20) of said multiplicity of individual crystals has at least on its base face (22) received inside the collimator (1), oriented towards the source of the event, and in the interspace between its lateral surfaces (23) and the adjacent septa (11) of the conduit (10) of the collimator (1) which contains it, a layer (24) of optically reflecting and diffusing material.

3. A scintigraphic device as claimed in claim 1, characterised in that said multiplicity of crystals (20), each of which is integrated in a corresponding conduit (10) of the collimator (1), has a crystal end portion (25) projecting beyond said common end plane (12) of the collimator and comprises a planar layer (26) for the rigid connection of all said crystal end portions (25) made of optically reflecting and diffusing material.

4. A scintigraphic device as claimed in claim 1, characterised in that said multiplicity of crystals (20), each of which is integrated in a corresponding conduit (10) of the collimator (1), has said base faces (21) of the crystals (20) oriented towards the photomultiplier (3) totally internal to the conduits (10) and lying on a same parallel plane and underlying said common end plans (12) of the collimator (1); on said base faces (21) of the crystals (20) and on the adjacent surfaces of the septa (11) said conduits (10) between the plane of lay of said base faces (21) and the common end plane (12) of the collimator (1) being present a layer (124) of optically reflecting and diffusing material.

5. A scintigraphic device as claimed in claim 4, characterised in that in the compartments defined between said base faces (21) of each crystal (20) the respective adjacent surfaces of the septa (11) of said conduits (10) comprised between the plane of lay of the base faces (21) themselves and the common end plane (12) of the collimator (1) is present an optical guide material (27).

6. A scintigraphic device as claimed in claims 2, 3 and 4, characterised in that said optically reflecting and diffusing material is constituted by a synthetic resin based paint.

7. A scintigraphic device as claimed in claim 6, characterised in that said synthetic resin is constituted by an epoxy resin.

8. A scintigraphic device as claimed in claim 1, characterised in that said individual scintillation crystals (20) and said corresponding conduits (10) have corresponding square shaped section.

9. A scintigraphic device as claimed in claim 1, characterised in that said collimator (1) is constructed with multiple modules of pre-set length, the first (13) of which, opposite to said photomultiplier (3), has integrated in the respective conduit (10) said multiplicity of crystals (20) and at least a consecutive module (14) being longitudinally correspondingly associated to the opposite end, held and guided for the perfect correspondence of the septa (11) by an external jacket element (19).

10. A scintigraphic device as claimed in claim 9, characterised in that said external jacket element (19) is made of inert and sterilisable material.

11. A scintigraphic device as claimed in claim 1, characterised in that it comprises a plurality of photomultipliers (3) positioned mutually adjacent and in that it comprises a single collimator (1) dimensioned to correspond to the entire receiving area determined by said plurality of photomultipliers (3).

12. A scintigraphic device as claimed in claim 1, characterised in that it comprises a plurality of photomultipliers (3) positioned mutually adjacent and in that it comprises a corresponding plurality of collimators (15, 16, 17, 18; 115, 116, 117, 118) positioned mutually adjacent and each of them corresponding in section to each of said plurality of photomultipliers.

13. A scintigraphic device as claimed in claim 12, characterised in that said plurality of collimators comprises collimators (150, 160, 270, 170) differentiated in width of the side of the crystal and corresponding width of the side of the relative collimator conduit to one or more of the adjacent collimators.

14. A scintigraphic device as claimed in claim 12, characterised in that said plurality of collimators comprises collimators differentiated by the length of the collimator from one or more of the adjacent collimators.

* * * * *